United States Patent
Glugla et al.

(10) Patent No.: US 9,382,857 B2
(45) Date of Patent: Jul. 5, 2016

(54) POST FUEL INJECTION OF GASEOUS FUEL TO REDUCE EXHAUST EMISSIONS

(71) Applicant: Ford Global Technologies, LLC, Dearborn, MI (US)

(72) Inventors: Chris Paul Glugla, Macomb, MI (US); John Edward Hedges, Canton, MI (US); Gopichandra Surnilla, West Bloomfield, MI (US); Eric Warren Curtis, Milan, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 14/133,472

(22) Filed: Dec. 18, 2013

(65) Prior Publication Data
US 2015/0167576 A1 Jun. 18, 2015

(51) Int. Cl.
*F02D 41/30* (2006.01)
*F02D 41/00* (2006.01)
*F02D 41/02* (2006.01)
*F02D 41/40* (2006.01)

(52) U.S. Cl.
CPC .......... *F02D 41/0027* (2013.01); *F02D 41/025* (2013.01); *F02D 41/0255* (2013.01); *F02D 41/405* (2013.01); *Y02T 10/26* (2013.01); *Y02T 10/44* (2013.01)

(58) Field of Classification Search
CPC ... F02D 41/30; F02D 2041/389; F02D 19/06; F02D 41/402; F02D 41/405
See application file for complete search history.

(56) References Cited

U.S. PATENT DOCUMENTS

| | | | |
|---|---|---|---|
| 6,374,798 B1 | 4/2002 | Nagai et al. | |
| 6,422,004 B1 * | 7/2002 | Takami et al. | 60/285 |
| 2002/0078918 A1 * | 6/2002 | Ancimer et al. | 123/295 |
| 2002/0162320 A1 * | 11/2002 | Uchida et al. | 60/284 |
| 2010/0256894 A1 * | 10/2010 | Yasui | 701/108 |
| 2012/0031371 A1 * | 2/2012 | Sabathil | 123/294 |
| 2012/0109496 A1 | 5/2012 | Hylands et al. | |

(Continued)

FOREIGN PATENT DOCUMENTS

| | | |
|---|---|---|
| EP | 1852601 A1 | 11/2007 |
| EP | 2224118 A1 | 9/2010 |
| WO | 2012021990 A1 | 2/2012 |

(Continued)

OTHER PUBLICATIONS

Glugla, Chris P. et al., "Method for Controlling Fuel Pressure for a LPG Engine," U.S. Appl. No. 14/019,445, filed Sep. 5, 2013, 38 pages.

Glugla, Chris P. et al., "Engine Control for a Liquid Petroleum Gas Fueled Engine," U.S. Appl. No. 14/019,191, filed Sep. 5, 2013, 54 pages.

(Continued)

*Primary Examiner* — Lindsay Low
*Assistant Examiner* — Kevin Lathers
(74) *Attorney, Agent, or Firm* — Julia Voutyras; Alleman Hall McCoy Russell & Tuttle LLP

(57) ABSTRACT

Methods and systems are provided for delivering gaseous fuel as multiple fuel injections split between an intake stroke, a compression stroke, and/or a power stroke to expedite exhaust catalyst heating during an engine cold-start. Fuel injected in the intake and compression stroke is ignited and combusted. The power stroke fuel injections are combusted in the exhaust port to increase exhaust temperature and pressure for faster catalyst light-off.

16 Claims, 3 Drawing Sheets

(56) References Cited

U.S. PATENT DOCUMENTS

2013/0179050 A1     7/2013    Munshi et al.
2013/0220286 A1     8/2013    Gingrich et al.

FOREIGN PATENT DOCUMENTS

WO       2013071430 A1    5/2013
WO       2013075234 A1    5/2013

OTHER PUBLICATIONS

Glugla, Chris P. et al., "Systems and Methods for Injecting Gaseous Fuel During an Exhaust Stroke to Reduce Turbo Lag," U.S. Appl. No. 14/030,916, filed Sep. 18, 2013, 56 pages.

Glugla, Chris P. et al., Systems and Methods for Controlling Ignition Energy During Exhaust Stroke Combustion of Gaseous Fuel to Reduce Turbo Lag, U.S. Appl. No. 14/030,933, filed Sep. 18, 2013, 55 pages.

* cited by examiner

POST FUEL INJECTION OF GASEOUS FUEL TO REDUCE EXHAUST EMISSIONS

TECHNICAL FIELD

The present application relates to methods and systems for reducing particulate exhaust emissions in a boosted engine system by injecting liquefied petroleum gas (LPG).

BACKGROUND AND SUMMARY

Engines may be configured with direct fuel injectors that inject fuel directly into a combustion cylinder (direct injection), and/or with port fuel injectors that inject fuel into a cylinder port (port fuel injection). Direct injection allows higher fuel efficiency and higher power output to be achieved in addition to better enabling the charge cooling effect of the injected fuel.

Further, during engine cold-starts, direct injection of fuel during a power stroke or exhaust stroke (also known as a post fuel injection) or late in a compression stroke allows for expedited heating of an exhaust catalyst. One example approach for expediting exhaust catalyst heating is shown by Nagai et al. in U.S. Pat. No. 6,374,798. Therein, fuel is injected in a compression stroke when more catalyst heating is required, and in an intake stroke when less catalyst heating is required.

However, the inventors herein have realized that gasoline direct injected engines generate more particulate matter emissions (or soot) during cold-starts and engine warm-up due to diffuse flame propagation wherein fuel may not adequately mix with air prior to combustion, as well as due to cylinder wall wetting. Since direct injection, by nature, is a relatively late fuel injection, there may be insufficient time for mixing of the injected fuel with air in the cylinder. Similarly, the injected fuel may encounter less turbulence when flowing through the valves. Consequently, there may be pockets of rich combustion that may generate soot locally, degrading exhaust emissions. Likewise, delivery of gasoline as a post fuel injection or a late compression stroke injection via a direct injector can lead to increased piston fuel wetting and a significant increase in tailpipe particulate emissions.

The inventors herein have recognized that at least some of the above mentioned issues may be addressed using methods for an engine system operating with direct injection of a gaseous fuel, such as liquefied petroleum gas. One example method comprises: during an engine cold-start, combusting a first amount of gaseous fuel during one or more of an intake stroke and a compression stroke of a first combustion event; and combusting a second amount of gaseous fuel during a power stroke of the first combustion event, a ratio of the first amount to the second amount adjusted to enable a rich air-fuel ratio at the spark plug for improved engine stability while maintaining overall combustion air-fuel ratio at stoichiometry in the cylinder. In this way, catalyst heating can be expedited without degrading exhaust emissions.

As an example, an engine system may be configured with a liquefied petroleum gas (LPG) fuel delivery system and the gaseous fuel (e.g., LPG) may be direct injected into the combustion chamber. During an engine cold-start condition, such as when an exhaust catalyst temperature is below a threshold temperature or efficiency, the gaseous fuel may be delivered to the engine as one or more of an intake stroke injection and a compression stroke injection. The fuel injection may be biased more towards the compression stroke injection as the exhaust catalyst temperature at the engine cold-start decreases. As such, the intake stroke injection may enable good mixing and during catalyst heating the injection may be lean. The compression stroke injection may then be used so that the air-fuel ratio at the spark plug is near stoichiometric so that the mixture ignites easier. Optionally, fuel may also be injected as single or multiple injections during the power stroke and combusted in the exhaust port. The resulting increase in exhaust temperature and pressure reduces the time till catalyst light-off. An amount of fuel injected in the intake, compression, and power strokes may be adjusted so as to maintain an overall exhaust air-fuel ratio at or around stoichiometry. In addition, a timing of the injections may be adjusted based on the catalyst temperature and spark timing. For example, as the catalyst temperature at the cold-start conditions decreases, the compression stroke injection may be performed closer to compression stroke top dead center (TDC) while the power stroke injection(s) is performed further from TDC. As another example, a smaller portion of fuel may be injected in the intake stroke while a larger portion of fuel is delivered in the compression stroke and as a post injection (in the power stroke). The split fuel injection strategy may be continued as the catalyst temperature or efficiency increases. When the exhaust catalyst is sufficiently warm (e.g., is at or above the light-off temperature), the post injection may be discontinued and fuel injection in one of the intake stroke or the compression stroke may be resumed. Alternatively, the split fuel injection strategy may be modified to discontinue the post fuel injection (in the power stroke) while maintaining the intake and compression stroke fuel injections until the catalyst is lit-off.

In this way, by injecting fuel into a cylinder after compression stroke TDC, the increased oxidation of hydrocarbons and carbon monoxide further increases exhaust temperature while reducing feedgas emissions. Overall, catalyst light-off efficiency is improved without degrading exhaust particulate It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
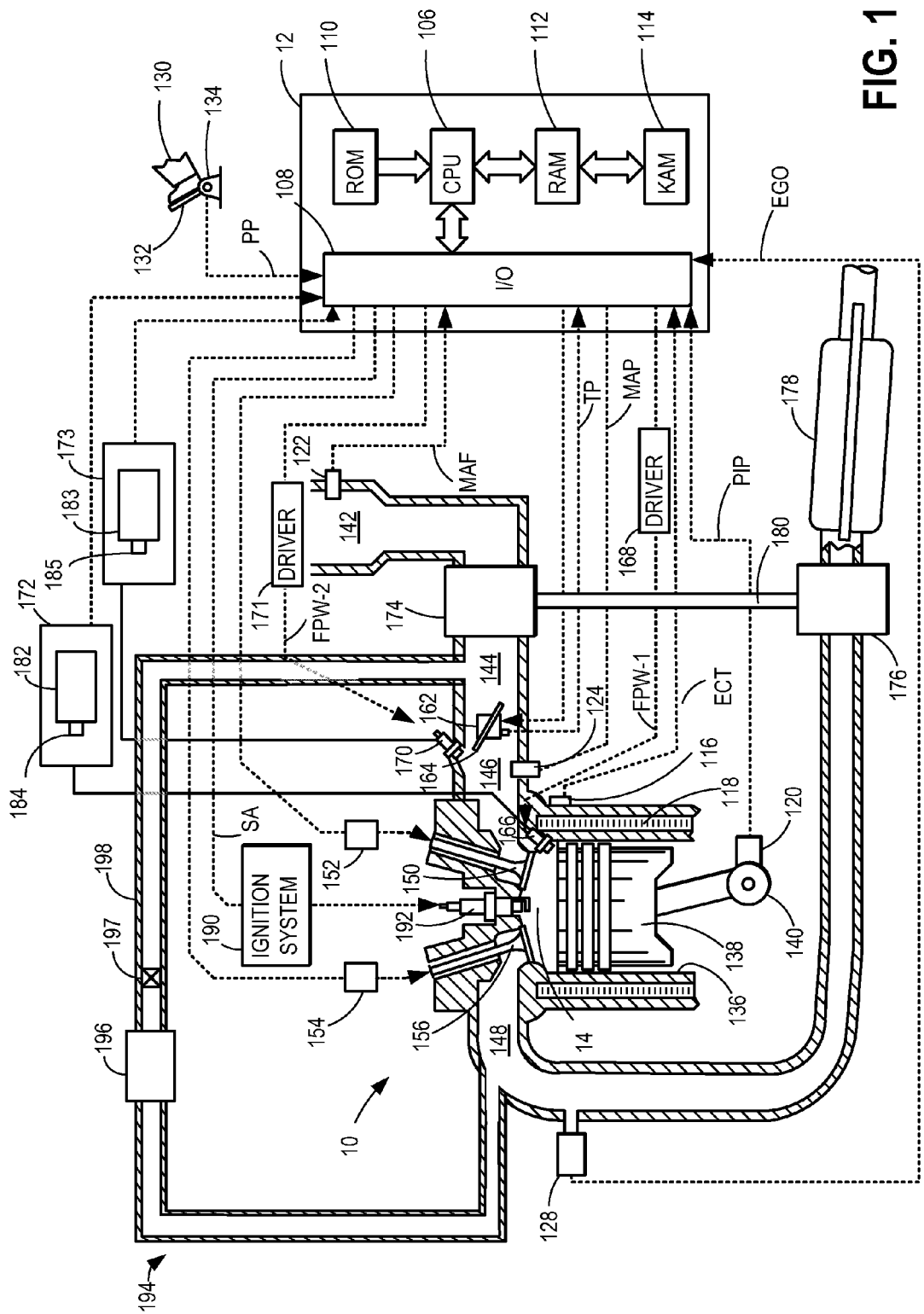
FIG. 1 shows a schematic depiction of an engine system configured to direct inject a gaseous fuel.

The present description relates to an engine system configured to deliver gaseous fuel via direct injection, such as the engine system of FIG. 1. Gaseous fuel may be delivered as a split fuel injection spread over multiple strokes of a cylinder combustion event during engine cold-start conditions. A controller may be configured to perform a control routine, such as the routine of FIG. 2 to deliver the gaseous fuel as one or more of an intake stroke and a compression stroke injection, as well as to deliver a portion of the fuel as a post injection in the power stroke. Example fuel injection profiles are shown with reference to FIG. 3.

FIG. 1 depicts an example embodiment of a combustion chamber or cylinder 14 of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (that is, combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 162 including a throttle plate 164 may be provided along an intake passage of the engine for varying the flow rate and/or pressure of intake air provided to the engine cylinders. Further, intake passage 144 may include a throttle inlet pressure (TIP) sensor (not shown) upstream of throttle 162 for estimating a throttle inlet pressure (TIP). Throttle 162 may be disposed downstream of compressor 174 as shown in FIG. 1, or may be alternatively provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Further, the emission control device 178 may comprise a temperature sensor (not shown) to provide an indication of temperature of the exhaust catalyst. Engine 10 may include an exhaust gas recirculation (EGR) system indicated generally at 194. EGR system 194 may include an EGR cooler 196 disposed along the EGR conduit 198. Further, the EGR system may include an EGR valve 197 disposed along EGR conduit 198 to regulate the amount of exhaust gas recirculated to the intake manifold 144.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing timing and/or lift amount of the respective intake and exhaust valves. The position of intake valve 150 and exhaust valve 156 may be determined by respective valve position sensors (not shown). The valve actuators may include electric valve actuation or cam actuation, or a combination thereof. In the example of cam actuation, each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

During engine operation, each cylinder within engine 10 typically undergoes a cylinder combustion event comprising a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 30 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 14 is at its smallest volume) is typically referred to by those of skill in the art as top dead center (TDC). In a process hereinafter referred to as injection, fuel is introduced into the combustion chamber during intake stroke (and/or compression stroke) of the cylinder combustion event. In a process hereinafter referred to as ignition, the injected fuel is ignited during compression stroke by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. In this way, a single cylinder combustion event may include an intake stroke, a compression stroke, an expansion stroke, and an exhaust stroke. Note that the above is shown merely as an example, and that intake and exhaust valve opening and/or closing timings may vary, such as to provide positive or negative valve overlap, late intake valve closing, or various other examples.

In some examples, engine 10 may be operated with post fuel injection. Specifically, in addition to the fuel injected during the intake stroke, as discussed above, fuel may also be injected during the power stroke. The fuel injected during the power stroke may be oxidized in the exhaust port. Alternatively, fuel may be injected during the exhaust stroke. Optionally, the fuel injected during the exhaust stroke may be ignited and combusted in the exhaust port. The injecting a second amount of fuel during the power stroke (or exhaust stroke) is referred to herein as post fuel injection. The post fuel injection may be advantageously used to raise exhaust temperature, thereby expediting activation of an exhaust catalyst. Thus, when operating the engine 10 with post fuel injection, a first amount of fuel may be combusted during the intake stroke and/or the compression stroke; and then a second amount of fuel is delivered during the power stroke of the same cylinder combustion event. Details of operating the engine 10 with post fuel injection will be further elaborated at FIGS. 2-3.

Each cylinder of engine 10 may include a spark plug 192 for igniting injected fuel and initiating combustion. Ignition system 190 can provide an ignition spark to combustion chamber 14 via spark plug 192 in response to a spark advance signal SA from controller 12.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Fuel may be delivered to fuel injector 166 by a first fuel system 172, which may be a high pressure fuel system, including a fuel tank, a fuel pump, and a fuel rail. In one example as shown in FIG. 1, the fuel system 172 may include a pressurized gas fuel tank 182, and a fuel pressure sensor 184 to detect the fuel pressure in the fuel tank 182.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 from second fuel system 173, which may be a liquid (e.g., gasoline, ethanol, or combinations thereof) fuel system, including a fuel tank, fuel pumps, and a fuel rail. In one example as shown in FIG. 1, fuel system 173 may include a fuel tank 183 and a fuel sensor 185, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used. In an alternate embodiment, fuel from the second fuel system may additionally or alternatively be delivered to an additional direct fuel injector for injecting fuel directly into the combustion chamber 14.

Note that a single driver 168 or 171 may be used for both fuel injection systems, or multiple drivers, for example driver 168 for fuel injector 166 and driver 171 for fuel injector 170, may be used, as depicted. The fuel system 172 may be a gaseous fuel system. In one example, the gaseous fuel may be stored in a liquid fuel tank as liquefied petroleum gas (LPG). In another example, the gaseous fuel may include CNG, hydrogen, LPG, LNG, etc. or combinations thereof. It will be appreciated that gaseous fuels, as referred to herein, are fuels that are gaseous at atmospheric conditions but may be in liquid form while at high pressure (specifically, above saturation pressure) in the fuel system. In comparison, liquid fuels, as referred to herein, are fuels that are liquid at atmospheric conditions. While FIG. 1 depicts a dual fuel system, in some examples, a single gaseous fuel system may be used to deliver gaseous fuel such as CNG, hydrogen, LPG, LNG, etc. or combinations thereof to the combustion chamber by direct injection.

It will be appreciated that while the depicted embodiment is configured to deliver one fuel via direct injection and another fuel via port injection, in still further embodiments, the engine system may include multiple port injectors wherein each of the gaseous fuel and the liquid fuel is delivered to a cylinder via port injection. Likewise, in other embodiments, the engine system may include multiple direct injectors wherein each of the gaseous fuel and the liquid fuel is delivered to a cylinder via direct injection.

As introduced above, during certain engine operating conditions, such as during engine cold-start conditions where the exhaust catalyst temperature is not above an activation temperature (or light-off temperature), fuel injection can cause a significant increase in particulate emissions. This is due to increased piston fuel wetting from direct injection of (liquid) fuel later in an intake stroke or compression stroke. The inventors have recognized that direct injection of a gaseous fuel such as LPG can improve engine cold conditions without substantially increasing particulate emissions. Specifically, the vaporization of gaseous fuel, such as LPG, delivered to a cylinder via direct injection enables fuel to be injected after top dead center (TDC) as a post injection, thereby providing increased oxidation of hydrocarbons and carbon monoxide, and reducing feedgas emissions. In addition, the increased exhaust temperature improves catalyst light off time and catalyst efficiency during the engine cold start conditions.

In one example, the direct injection (DI) gaseous fuel system 172 may be configured to deliver fuel as one or more post fuel injections during engine cold-start conditions to improve catalyst light-off. This is in addition to injecting fuel (e.g., a first amount of fuel) during an intake stroke and/or compression stroke for cylinder combustion during the compression stoke. The post fuel injection may include injecting fuel (e.g., a second amount of fuel) during a power stroke of a cylinder combustion event (e.g., after compression stroke TDC). The post fuel injection is then combusted in the exhaust port. The released hot exhaust is then used to expedite heating of the exhaust catalyst. In some cases, ignition may not be needed. In the event ignition is needed, ignition timing may be dependent on the exhaust valve timing positions. For example, ignition timing may be in a general range from TDC to 40 ATC. Further details regarding the utilization of a post fuel injection for improving catalyst light-off by reducing the duration to bring a temperature of emission control device 178 (e.g., temperature of an exhaust three way catalyst or exhaust catalyst) to a threshold temperature is provided with reference to FIGS. 2-3.

Returning to FIG. 1, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from MAP sensor 124. Engine speed signal, RPM, may be generated by controller 12 from signal PIP. Further, the controller may receive a turbine speed signal (not shown)

from a turbine speed sensor (not shown) located at the turbine 176. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft. Additionally, a spark timing, that is, a point of time during the cylinder combustion event when the spark plug fires in the cylinder to initiate combustion, may be adjusted by the controller.

As described above, FIG. 1 shows only one cylinder of a multi-cylinder engine. As such, each cylinder may similarly include its own set of intake/exhaust valves, fuel injector(s), spark plug, etc.

In this way, the system of FIG. 1 enables a method for an engine comprising: during an engine cold-start, combusting a first amount of gaseous fuel during one or more of an intake stroke and a compression stroke of a first combustion event, and then combusting a second amount of gaseous fuel during a power stroke of the first combustion event. Herein, a ratio of the first amount to the second amount is adjusted to maintain overall combustion air-fuel ratio at stoichiometry. In this way, catalyst heating is expedited without raising exhaust particulate emissions.

Figure 2:
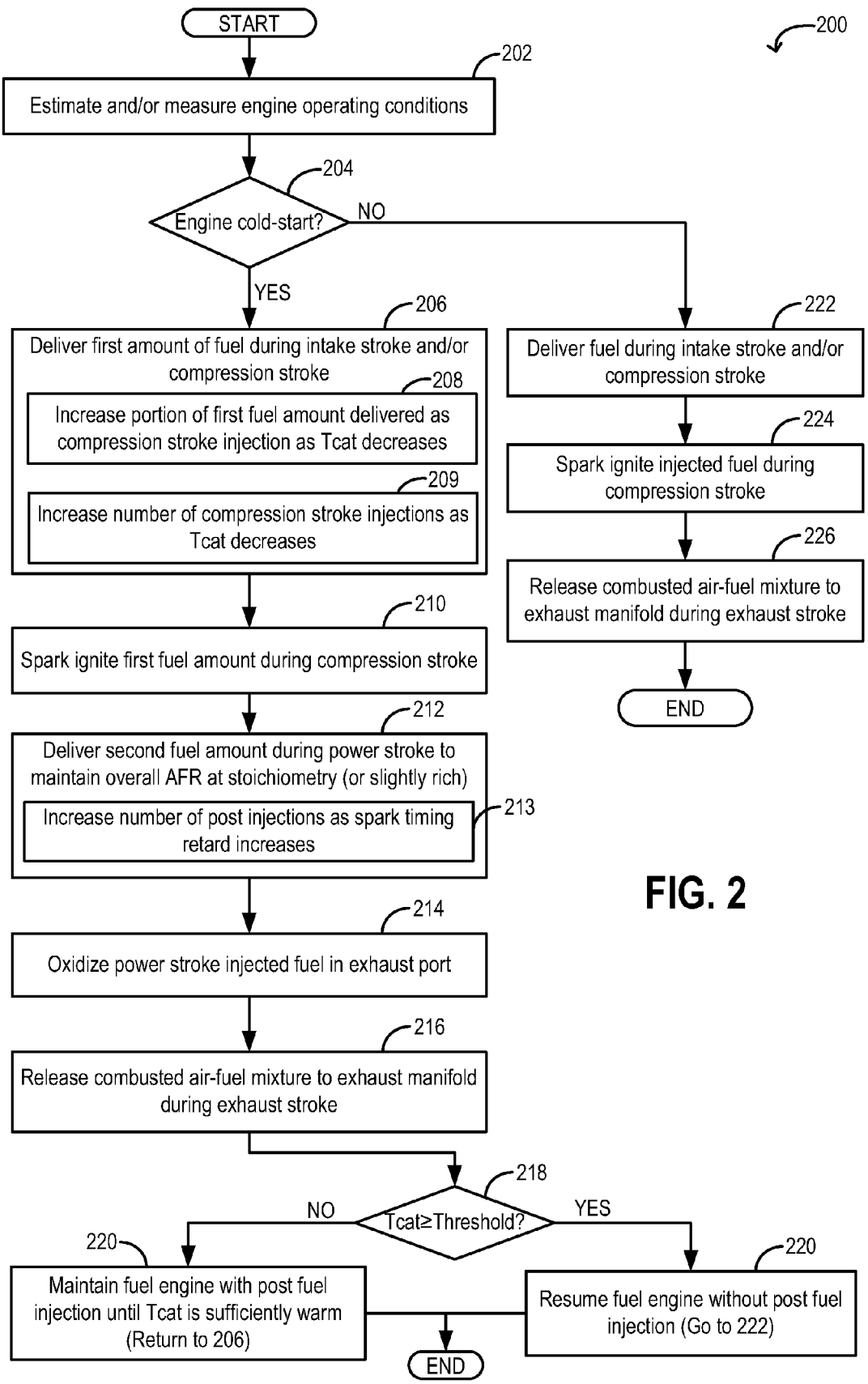
FIG. 2 shows a flowchart depicting an example method for adjusting a fuel injection profile during an engine cold-start injection.

Turning to FIG. 2, an example method 200 for performing fuel injection of a gaseous fuel during a cylinder combustion event is shown. The routine includes a post fuel injection during engine cold-start conditions to improve catalyst light-off. An engine controller, such as controller 12 shown in FIG. 1, may execute method 200 based on instructions stored thereon.

At 202, the method includes estimating and/or measuring engine operating conditions. These may include, but are not limited to, engine speed and load, operator torque demand, mass air flow, throttle position, boost pressure, manifold absolute pressure, manifold temperature, engine coolant temperature, barometric pressure, exhaust catalyst temperature, pedal position, ambient temperature, etc.

At 204, based on the engine operating conditions, it may be determined if engine cold-start conditions are present. For example, an engine cold-start may be confirmed if the exhaust catalyst temperature is below a threshold temperature (e.g., a light-off temperature) when the engine is restarted. If an engine cold-start condition is not confirmed, that is, an engine hot start or hot restart is being performed, the routine proceeds to 222 wherein fuel is delivered during an intake stroke. The amount of fuel delivered may be based on operator torque demand and engine speed-load conditions. In some examples, based on the engine operating conditions, fuel may alternatively or additionally be delivered in the compression stroke. Thus, fuel may be delivered as an intake stroke injection only, a compression stroke injection only, or each of an intake stroke injection and a compression stroke injection. Further still, based on the amount of fuel to be delivered, the nature of the fuel, as well as the existing engine operating conditions, the fuel injection may be delivered as a single (intake stroke and/or compression stroke) injection or multiple (intake stroke and/or compression stroke) fuel injections. Additionally, the amount of fuel injected at 222 may be adjusted to provide a stoichiometric combustion air-fuel ratio. In alternate examples, however, the amount of fuel injected may be adjusted to provide a rich or lean air-fuel ratio, as requested.

At 224, combustion of fuel delivered to the combustion chamber may be initiated by spark ignition during compression stroke. For example, the routine may include spark igniting the amount of fuel in the cylinder with a spark plug, such as the spark plug 192 shown in FIG. 1. At 228, the combusted air-fuel mixture may be released into the exhaust manifold during the exhaust stroke. As such, a post fuel injection may not be performed during hot engine restarts.

Returning to 204, if an engine cold-start is confirmed, a fuel injection profile including a post injection may be used. As such, during the engine warm up period, since the catalyst is not operating at its optimal temperature, there may be increased emissions (e.g., NOx or particulate matter emissions) from the exhaust. Thus, in order to reduce the time required to achieve catalyst threshold temperature, post fuel injection may be performed. By performing the post fuel injection during conditions when catalyst temperature is less than its optimal operating temperature, the additional heat from the exhaust gas may be partially utilized to warm-up the exhaust catalyst to its operating temperature faster than when post fuel injection is not performed. As a result, decreased exhaust emissions may be achieved during cold-start conditions. In addition, by using a gaseous fuel, the rapid vaporization and associated charge cooling properties of the gaseous fuel allows for later fuel injection times to be used (e.g., later into the compression stroke or beyond the compression stroke) with reduced piston fuel wetting and therefore reduced particulate matter generation.

Specifically, at 206, the routine includes, during a first combustion event from rest of the engine cold-start, delivering a first amount of gaseous fuel (such as LPG) to the combustion chamber during one or more of an intake stroke and a compression stroke of a cylinder combustion event (e.g., cylinder cycle). The first amount of gaseous fuel may be delivered as a single intake stroke injection, multiple intake stroke injections, a single compression stroke injection, multiple compression stroke injections, or at least one intake stroke injection and at least one compression stroke injection.

When using a combination of intake stroke and compression stroke injections, more of the first fuel amount may be delivered later into the compression stroke as the exhaust catalyst heating need increases. Specifically, at 208, a larger portion of the first fuel amount may be delivered in the compression stroke as the exhaust catalyst temperature estimated during the engine cold-start decreases. For example, 10% of the first fuel amount may be delivered as an intake stroke injection while a remaining 90% of the first fuel amount may be delivered as a compression stroke injection. As another example, 20% of the first fuel amount may be delivered as an intake stroke injection while a remaining 80% of the first fuel amount may be delivered as a compression stroke injection. In some embodiments, the portion of the first fuel amount delivered in the intake stroke relative to the compression stroke (split ratio) may be dependent on engine hardware, such as fuel injector capacity. Likewise, at 209, a number of compression stroke fuel injections may be increased as the exhaust catalyst temperature estimated during the engine cold-start decreases. For example, the compression stroke fuel injection amount may be delivered as 1-3 (or more) compression stroke injections. In addition to adjusting an amount of fuel delivered in the compression stroke, a timing of fuel delivered in the compression stroke may also be adjusted. For example, as the exhaust catalyst temperature decreases (that is, as the catalyst gets colder), the compression stroke injection amount may be delivered later in the compression stroke, that is, closer to compression stroke TDC. Likewise, in addition to adjusting an amount of fuel delivered in the intake stroke, a timing of fuel delivered in the intake stroke may also be adjusted. For example, as the exhaust catalyst temperature decreases (e.g., as the temperature is colder), the intake stroke injection amount may be delivered closer to intake stroke BDC. By increasing a portion of fuel delivered during the compression stroke, engine combustion stability is improved. In addition, significant spark timing retard can be used and/or increased engine out enthalpy can delivered to the exhaust catalyst. By using a post fuel injection with the initial injection (as discussed at 212), fuel can be delivered later in the compression stroke without wetting the piston (impingement) on cold engines.

In one example, the first fuel amount may be adjusted to produce a lean air-fuel ratio. Then, a second amount of fuel injected during the power stroke (the post injection) may be adjusted to compensate for the leaner air-fuel ratio and produce an overall stoichiometric (or slightly rich) air-fuel ratio. Adjusting the second amount of fuel is discussed further below at 212.

In alternate embodiments, the first fuel amount may be based on a gaseous fuel amount producing a stoichiometric air-fuel ratio. The injected fuel may be a gaseous fuel such as LPG and the fuel may be injected directly into the combustion chamber by a direct-injection (DI) system, as described at FIG. 1. For example, a direct fuel injector, such as fuel injector 166 shown in FIG. 1, may inject a first amount of LPG into the engine cylinder (e.g., combustion chamber) during the intake stroke or compression stroke of the cylinder combustion event.

At 210, the routine includes combusting the first amount of gaseous fuel delivered injected during one or more of the intake stroke and the compression stroke of the first combustion event by spark ignition during a compression stroke of the cylinder cycle. For example, the controller may spark ignite the first amount of fuel with a spark plug, such as spark plug 192 of FIG. 1, during the compression stroke. In one example, during the engine cold-start, spark timing may be retarded from MBT to increase exhaust heat delivery. For example, as the exhaust catalyst temperature decreases, spark timing may be further retarded from MBT. However, in alternate examples, by using a post injection (as discussed below) with a smaller amount of spark timing retard, catalyst heating may be expedited while incurring a smaller fuel penalty.

At 212, the routine includes delivering a second amount of gaseous fuel during a power stroke of the first combustion event. As such, this may constitute a post fuel injection. During post fuel injection, the second fuel amount may be delivered to the combustion chamber via direct injection. That is, the second fuel amount may be delivered during a second fuel injection, the second fuel injection performed separately from the first fuel injection. In one example, the second fuel amount may be smaller than the first fuel amount.

In one example, a gaseous fuel may be injected into the cylinder during the power stroke. The gaseous fuel may be stored in a liquid fuel tank as liquefied petroleum gas (LPG). Alternatively, the gaseous fuel may include CNG, hydrogen, LPG, LNG, etc. or combinations thereof.

In one example, each of the first and second amounts of fuel is delivered via direct injection. In alternate examples, however, at least the second amount of fuel is delivered via direct injection.

Due to lean operation during the first fuel injection, the second fuel amount may be adjusted such that residual oxygen after the first fuel combustion may be consumed during combustion of the second fuel amount. As such, the overall air-fuel ratio of the cylinder combustion event may be maintained at stoichiometry or slightly rich. Thus, a ratio of the first amount of fuel to the second amount of fuel may be adjusted to maintain the overall combustion air-fuel ratio at stoichiometry. The second amount of fuel delivered and combusted during the power stroke may be based on the temperature of the exhaust catalyst. For example, a larger amount of fuel may be injected during the power stroke as a difference between the exhaust catalyst temperature and a threshold temperature (e.g., the light-off temperature) increases during the cold-start. The second amount of fuel may be delivered as a single power stroke injection or a power stroke injections. At 213, a number of power stroke injections may be adjusted based on spark timing. For example, as spark timing retard (from MBT) increases, the number of power stroke injections may be increased. For example, the number of fuel injections may increase (e.g, to 1-3 injections) after initial engine start and upon entering the catalyst heating mode. A timing of the power stroke injections may also be adjusted based on spark timing and exhaust catalyst temperature. For example, as the catalyst temperature decreases, the power stroke injection may be performed further past compression stroke TDC.

In some examples, during the post injection, the controller may also control a pressure of the fuel injector. For example, during the injecting of fuel in the power stroke, the controller may increase the fuel pressure (50 bar to 200 bar) to improve fuel injector vaporization.

Subsequently, at 214, the second fuel amount injected may be combusted or oxidized in the exhaust port (e.g., during the exhaust stroke). The second fuel injection may be ignited by spark ignition if operating conditions are such that the temperature in the exhaust is not sufficient to start ignition. By performing post fuel injection, and oxidizing the port injected fuel in the exhaust port, additional exhaust gas heat may be generated, which may be partly utilized to warm the exhaust catalyst to an activation temperature. At 216, the combusted air-fuel mixture may be released to the exhaust manifold during the exhaust stroke.

At 218, it may be determined if the exhaust catalyst temperature (Tcat) is at or above a threshold temperature, such as a catalyst light-off temperature. If the exhaust catalyst is sufficiently warm, then the controller may stop post fuel injection. That is, the controller may resume fuel injection without a post fuel injection and return to 222 to inject fuel as an intake and/or compression stroke injection only. Post fuel injection may be terminated by stopping injecting the second amount of gaseous fuel when the exhaust catalyst temperature increases above the threshold temperature.

If the exhaust catalyst has not been sufficiently warmed and activated, the routine proceeds to 220 wherein post fuel injection is maintained for a number of combustion events since the first combustion event from rest. Thus, the controller returns to 206 and continues to combust the first amount and second amount of fuels for a number of combustion events, the number based on exhaust catalyst temperature relative to the threshold temperature. For example, the number of combustion events may be increased as a difference between the exhaust catalyst temperature and the threshold temperature increases. After the number of combustion events have elapsed, the controller may resume combusting gaseous fuel at stoichiometry by delivering fuel in the intake stroke only.

In this way, post fuel injection may be utilized to reduce time taken for catalyst to light-off. By utilizing gaseous fuel for post fuel injection, production of soot and particulate matter may be reduced. By oxidizing the post fuel injection amount, additional heat generated by post fuel combustion may be efficiently utilized to improve catalyst light-off.

In one example, an engine system comprises an engine cylinder; a direct fuel injector coupled to the cylinder; a fuel rail coupled upstream of the fuel injector; a fuel tank for storing gaseous fuel under pressure as a liquid; a pressure regulator for adjusting a pressure of gaseous fuel delivered from the fuel tank into the fuel rail; and an exhaust catalyst coupled in an engine exhaust passage. The engine system further includes a controller with computer readable instructions for: during an engine cold-start condition, until an exhaust catalyst temperature is at or above a threshold temperature, delivering gaseous fuel as multiple injections including at least a compression stroke injection and a power stroke injection; and combusting the delivered fuel at stoichiometry. The multiple injections may include a first intake stroke injection, a second compression stroke injection, and a third power stroke injection. A timing and ratio of the first, second, and third injections may be based on spark ignition timing. For example, a ratio of the second compression stroke injection relative to the first intake stroke injection may be increased and a timing of the second compression stroke injection may be moved closer to TDC as spark timing is retarded from MBT. Further, a timing of the power stroke injection may be moved further past TDC as the spark timing is retarded from MBT.

Figure 3:
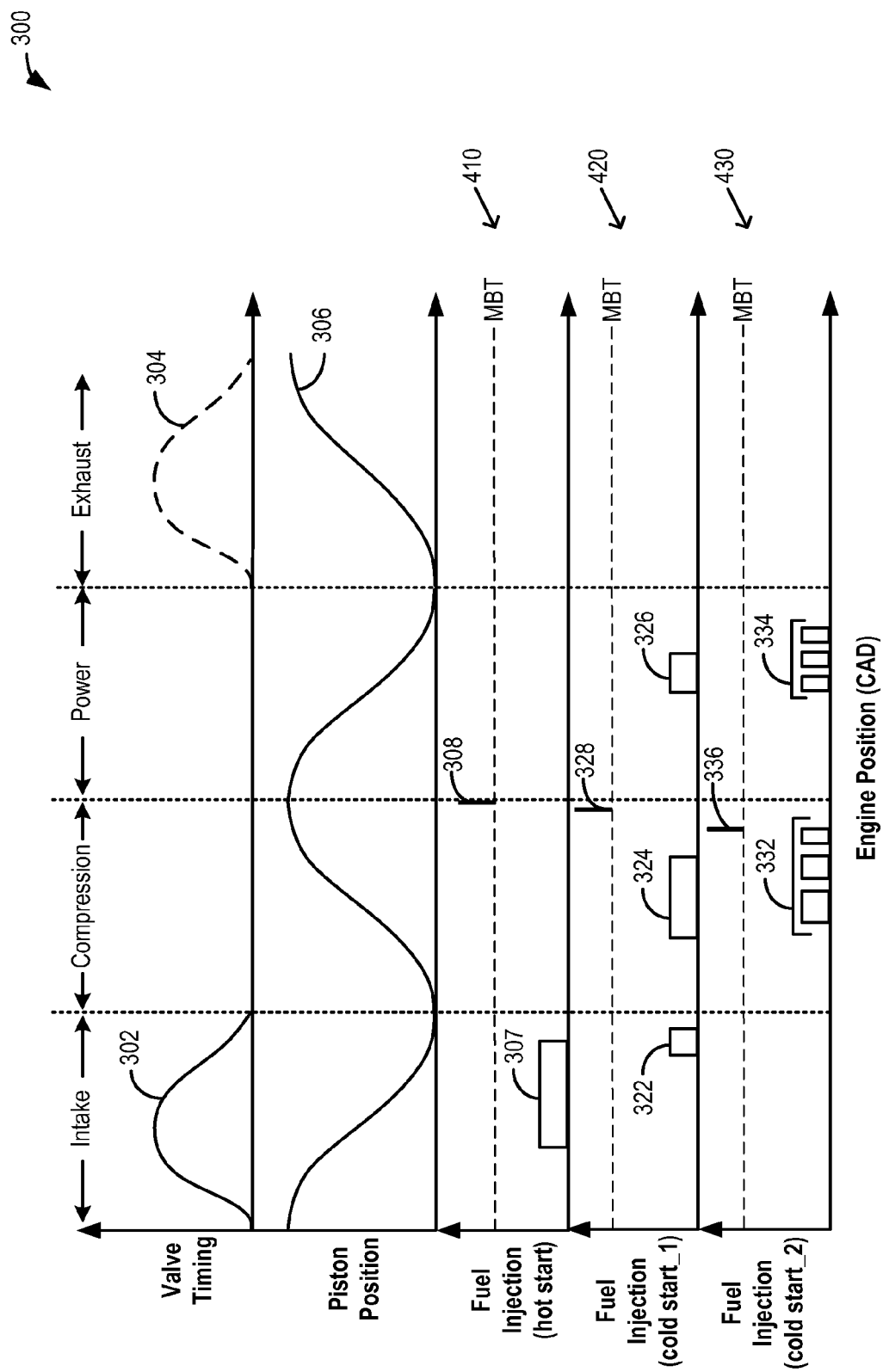
FIG. 3 shows example fuel injection profiles for an engine cold-start condition.

Now turning to FIG. 3, map 300 depicts example fuel injection and post fuel injection timings that may be used to improve catalyst light-off. Catalyst light-off may be improved by reducing time required to increase the exhaust catalyst temperature to a threshold (light-off) temperature. Map 300 depicts intake valve timing at plot 302, exhaust valve timing at plot 304, piston position at plot 306, an example fuel injection profile used during an engine hot start at 410, and example fuel injection profiles or two different cold start conditions at 420 and 430. In each of the fuel injection profiles 410-430, injection amounts and timings are shown as boxes (307, 322-326, 332-334) while spark timing events are shown as bars (308, 328, 336).

During an engine start, while the engine is being cranked, an engine controller may be configured to adjust a fuel injection profile of fuel delivered to the cylinder. In particular, fuel may be delivered as a first profile 410 during a hot engine start, and as one of a second profile 420 or third profile 430 during a cold engine start. In one example, during a cold start, the engine fueling may be initiated as per profile 420 or 430 and then transitioned to profile 410 (e.g., during or following engine cranking). The differing cold start fuel injection profiles may include a portion of the fuel delivered to the cylinder as a post fuel injection in the power stroke. In addition, fuel may be direct injected as a single intake stroke injection, a single compression stroke injection, or a combination thereof.

Map 300 illustrates an engine position along the x-axis in crank angle degrees (CAD). Curve 306 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 306, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 304) and an intake valve (solid curve 302) during a normal engine operation. As illustrated, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

The third plot (from the top) of map 300 depicts an example fuel injection profile 410 that may used during engine cranking. In the depicted example, fuel injection profile 410 may be used during a first combustion event since engine start. Herein, the engine start is an engine hot start. An engine controller is configured to provide the total amount of fuel to the cylinder as a single intake stroke injection, depicted at 307. In addition, spark is provided close to MBT, as depicted at 308, for example at 10 BTDC. Fuel injection profile 410 does not include a post fuel injection. In alternate example, the fuel amount may be provided as a single compression stroke injection.

The fourth plot (from the top) of map 300 depicts an example fuel injection profile 420 that may used during engine cranking. In the depicted example, fuel injection profile 420 may be used during a first combustion event since engine start. Herein, the engine start is an engine cold start. An engine controller is configured to provide fuel to the cylinder as a first intake stroke injection, depicted at 322 and a second compression stroke injection, depicted at 324. The first intake stroke injection 322 may include a first amount of fuel that is direct injected at a first timing during the intake stroke. The second compression stroke injection may include a second amount of fuel that is direct injected at a second timing during the compression stroke. Thus, during the cold-start, a larger portion of the injection may be delivered in the compression stroke as compared to the intake stroke.

In addition to delivering fuel in the intake stroke and the compression stroke, fuel is injected as a post fuel injection during the power stroke, depicted at 326. Injection amounts 322, 324, and 326 are adjusted so as to maintain an overall combustion air-fuel ratio at or around stoichiometry. In the depicted example, the fuel injection profile includes a split ratio of fuel mass injected (that is, ratio of fuel intake stroke injected:fuel that is compression stroke injected:fuel that is power stroke direct injected) that is set to 10:80:10. In alternate examples, the required fuel mass for engine operation is split as required. In addition, spark ignition is provided with spark retarded from MBT, as depicted at 328, for example at 10 BTDC. The spark event delivered in the compression stroke is used to combust fuel injections delivered to the cylinder in the intake stroke and compression stroke (322 and 324). Fuel injection amount 326 is then oxidized in the exhaust port, during an exhaust stroke, releasing hot exhaust into the exhaust manifold. By using spark retard in combination with a post fuel injection, an exhaust catalyst temperature can be rapidly increased to a light-off temperature, improving engine performance at the engine cold-start. Further, by splitting fuel delivery into a first intake stroke injection, a second compression stroke injection, and a third power stroke injection, the catalyst light-off temperature can be attained without raising exhaust particulate matter (PM) emissions and degrading engine combustion stability. This allows an engine start emissions to be improved.

The fifth plot (from the top) of map 300 depicts an example fuel injection profile 430 that may be used during engine cranking. In the depicted example, fuel injection profile 430 may be used during a first combustion event since engine start. Herein, the engine start is an engine cold start that is colder than the engine cold start of fuel injection profile 420. For example, an exhaust catalyst temperature may be lower at profile 430 as compared to profile 420.

An engine controller is configured to provide fuel to the cylinder as multiple (herein, three) compression stroke injections, depicted at 332. For example, the multiple compression stroke injections 332 may include a first compression stroke injection at 90 degrees BTDC, a second compression stroke injection at 45 degrees BTDC, and a third compression stroke injection at 10 degrees BTDC. Depending in the controller's capability, and the fuel injector sizing (capacity), the number of compression stroke injections, a timing of each injection, and a fuel mass delivered in each compression stroke injection may be varied. In this way, during the cold-start, a larger portion of the compression stroke injection may be delivered later in the compression stroke.

In addition to delivering fuel in the compression stroke, fuel is injected as multiple (herein, three) post fuel injections during the power stroke, depicted at 334. Injection amounts 332, and 334 are adjusted so as to maintain an overall combustion air-fuel ratio at or around stoichiometry.

In addition, spark ignition is provided with spark retarded from MBT, as depicted at 336, for example at 10 BTDC. The spark event delivered in the compression stroke is used to combust fuel injections delivered to the cylinder in the compression stroke (332). Fuel injection amount 334 is then oxidized in the exhaust port, during an exhaust stroke, releasing hot exhaust into the exhaust manifold. By using spark retard in combination with a post fuel injection, an exhaust catalyst temperature can be rapidly increased to a light-off temperature, improving engine performance at the engine cold-start. Further, by splitting fuel delivery into multiple compression stroke injections, and multiple power stroke injections, the catalyst light-off temperature can be attained without raising exhaust particulate matter (PM) emissions and degrading engine combustion stability. This allows an engine start emissions to be improved.

In one example, during an engine cold-start, a controller may direct inject a first amount of liquefied petroleum gas (LPG) during an intake stroke of a combustion event; direct inject a second amount of LPG during a compression stroke of the combustion event; and then combust the first and second amounts in the compression stroke. The controller may further direct inject a third amount of LPG during a power stroke, the first, second, and third amounts adjusted to maintain overall exhaust air-fuel ratio at stoichiometry. Herein, the first and second amounts may be combusted during the compression stroke while the third amount is combusted in an exhaust port during an exhaust stroke. Further, one or more of the first, second, and third amounts of LPG may be delivered as multiple fuel injections. For example, fuel may be delivered as multiple intake stroke injections, multiple compression stroke injections, multiple power stroke injections, or a combination thereof. A proportion of the second amount of compression stroke injection relative to the first amount of intake stroke injection may be increased as a temperature of an exhaust catalyst during the cold-start decreases. The controller may continue injecting LPG as each of a first, second, and third injection amount during the engine cold start until an exhaust catalyst temperature is at or above a threshold temperature.

During the post injection, the controller may also control a pressure of the fuel injector. For example, during the injecting of fuel in the power stroke, the controller may adjust (e.g., increase or decrease) the fuel injector pressure based on one or more of the amount of fuel injected during the power stroke, an injection timing of fuel injected during the power stroke, and an in-cylinder pressure at a time of injecting fuel during the power stroke. In one example, the fuel injector pressure is increased to provide maximum mixing which is beneficial to reduce soot generation.

In this way, timing of delivery of post fuel injection, and spark timing and energy for post fuel injection combustion may be adjusted, thereby providing additional exhaust energy which may be utilized at least partially to reduce turbo lag when a torque demand increase is greater than a threshold and/or to decrease the duration for catalyst to light-off when exhaust catalyst temperatures are below the threshold temperature.

In this way, performing post fuel injection during transient conditions may reduce the duration to accelerate the turbocharger to a desired speed and provide desired boost. Additionally, performing post fuel injection during cold start conditions may reduce the duration for the exhaust catalyst to warm up to a threshold operating temperature. By spark-igniting the fuel during post fuel injection, loss of heat to the combustion chamber may be reduced. Further, by utilizing fuel such as LPG, which is injected in a gaseous form, formation of soot and particulate matter may be reduced. In this way, by injecting and combusting a second amount of fuel during an the exhaust stroke of a cylinder combustion event responsive to turbo lag and/or exhaust catalyst temperature, a technical effect is achieved, thereby reducing turbo lag and improving catalyst light-off.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related appli-

The invention claimed is:

1. A method for an engine, comprising:
during an engine cold-start,
combusting a first amount of gaseous fuel injected during one or more of an intake stroke and a compression stroke of a first combustion event;
combusting a second amount of gaseous fuel injected during a power stroke of the first combustion event, a ratio of the first amount to the second amount adjusted to maintain overall combustion air-fuel ratio at stoichiometry; and
wherein the second amount of gaseous fuel is injected during a set number of power stroke injections, the number of the power stroke injections based on spark timing.

2. The method of claim 1, wherein a larger portion of the first amount of gaseous fuel is injected later into the compression stroke as an exhaust catalyst temperature estimated via a temperature sensor during the engine cold-start decreases.

3. The method of claim 1, wherein the second amount of gaseous fuel is injected later into the power stroke as an exhaust catalyst temperature estimated via a temperature sensor during the engine cold-start decreases.

4. The method of claim 1, wherein the number of power stroke injections is increased as spark timing is retarded from MBT.

5. A method for an engine comprising:
during an engine cold-start,
combusting a first amount of gaseous fuel injected during one or more of an intake stroke and a compression stroke of a first combustion event;
combusting a second amount of gaseous fuel injected during a power stroke of the first combustion event, a ratio of the first amount to the second amount adjusted to maintain overall combustion air-fuel ratio at stoichiometry; and
continuing the combusting the first amount and the second amount for a number of combustion events since the first combustion event, the number of combustion events based on exhaust catalyst temperature estimated via a temperature sensor relative to a threshold temperature.

6. The method of claim 5, wherein the number of combustion events is increased as a difference between the exhaust catalyst temperature estimated via the temperature sensor and the threshold temperature increases.

7. The method of claim 5, further comprising, after the number of combustion events have elapsed, combusting gaseous fuel at stoichiometry in the intake stroke.

8. The method of claim 5, wherein the gaseous fuel is stored in a liquid fuel tank as liquefied petroleum gas (LPG).

9. The method of claim 5, wherein each of the first and the second amount of fuel is delivered via a direct injection.

10. An engine method, comprising:
during an engine cold-start,
direct injecting a first amount of liquefied petroleum gas (LPG) during an intake stroke of a combustion event;
direct injecting a second amount of LPG during a compression stroke of the combustion event;
combusting the first and second amounts in the compression stroke;
direct injecting a third amount of LPG during a power stroke, the first, second, and third amounts adjusted to maintain overall exhaust air-fuel ratio at stoichiometry; and
wherein a timing of injection of the second amount of LPG during the compression stroke is moved closer to TDC as spark timing is retarded from MBT.

11. The method of claim 10, wherein the first and second amounts are combusted during the compression stroke and wherein the third amount is combusted in an exhaust port.

12. The method of claim 11, wherein one or more of the first, second, and third amount of LPG is delivered as multiple fuel injections.

13. The method of claim 12, wherein a proportion of the second amount relative to the first amount is increased as a temperature of an exhaust catalyst estimated via a temperature sensor during the cold-start decreases.

14. The method of claim 13, further comprising, during the injecting the third amount of fuel, adjusting a fuel injector pressure based on one or more of the third amount of fuel, an injection timing of the third amount of fuel, and an in-cylinder pressure at a time of injecting the third amount of fuel.

15. The method of claim 10, further comprising, continuing injecting LPG as each of a first, second, and third injection amount until an exhaust catalyst temperature estimated via a temperature sensor is at or above a threshold temperature.

16. An engine system, comprising:
an engine cylinder;
a direct fuel injector coupled to the cylinder;
a fuel rail coupled upstream of the fuel injector;
a fuel tank for storing gaseous fuel under pressure as a liquid;
a pressure regulator for adjusting a pressure of gaseous fuel delivered from the fuel tank into the fuel rail;
an exhaust catalyst coupled in an engine exhaust passage; and
a controller with computer readable instructions for:
during an engine cold-start condition, until an exhaust catalyst temperature estimated via a temperature sensor is at or above a threshold temperature,
delivering gaseous fuel as multiple injections;
combusting the delivered fuel at stoichiometry;
wherein the multiple injections include a first intake stroke injection, a second compression stroke injection, and a third power stroke injection;
wherein a timing and a ratio of the first, second, and third injections are based on spark ignition timing; and
wherein a ratio of the second compression stroke injection relative to the first intake stroke injection is increased and a timing of the second compression stroke injection is moved closer to TDC as the spark timing is retarded from MBT, and wherein a timing of the power stroke injection is moved further past TDC as the spark timing is retarded from MBT.

* * * * *